May 19, 1964  F. A. McCORMICK ETAL  3,133,481
ARTICLE FEED CONTROL APPARATUS AND METHOD
Filed June 29, 1961  5 Sheets-Sheet 2
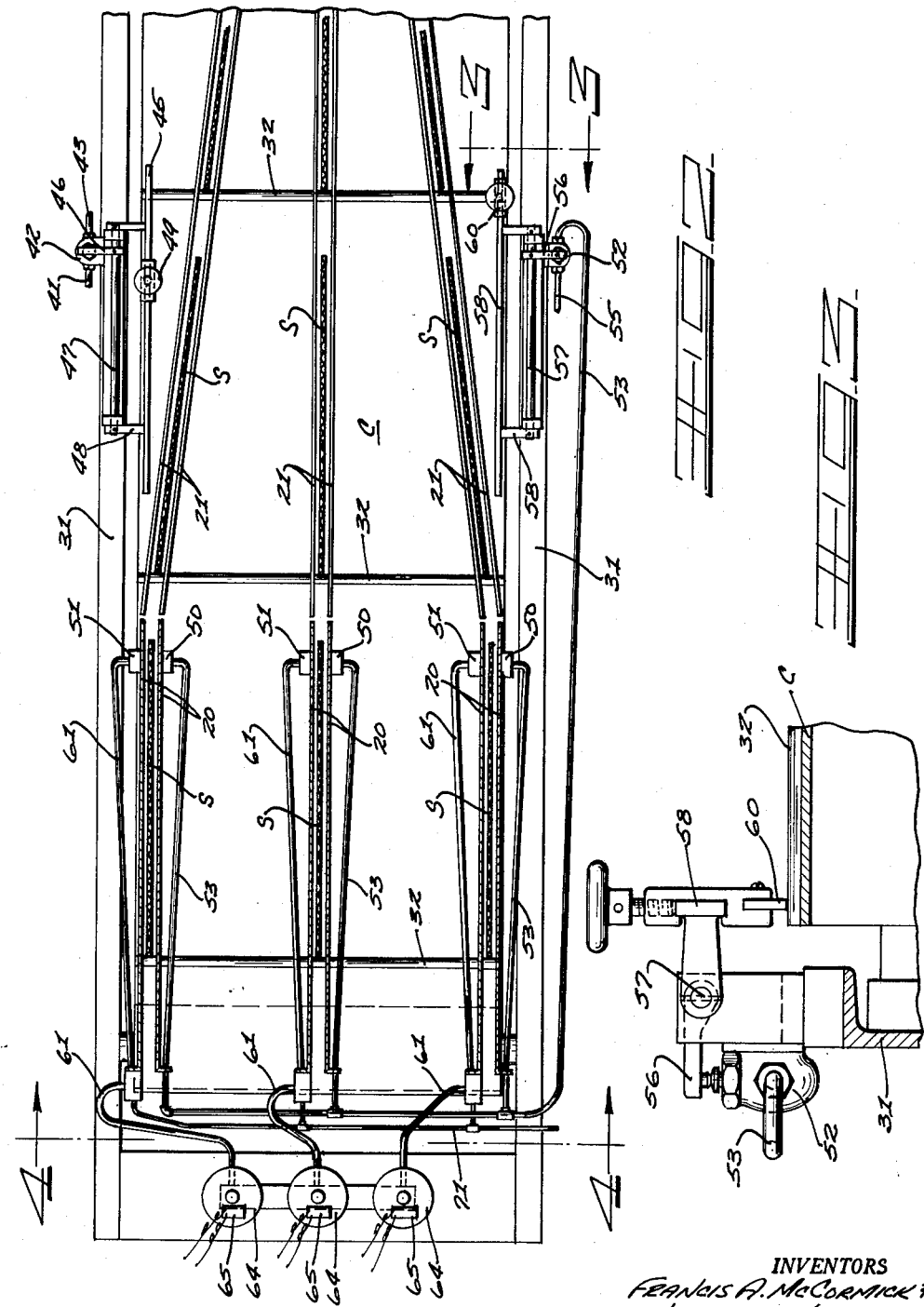
INVENTORS
FRANCIS A. McCORMICK &
BY WALTER T. NACHTRAB
J. R. Nelson and
W. A. Schaich
ATTORNEYS

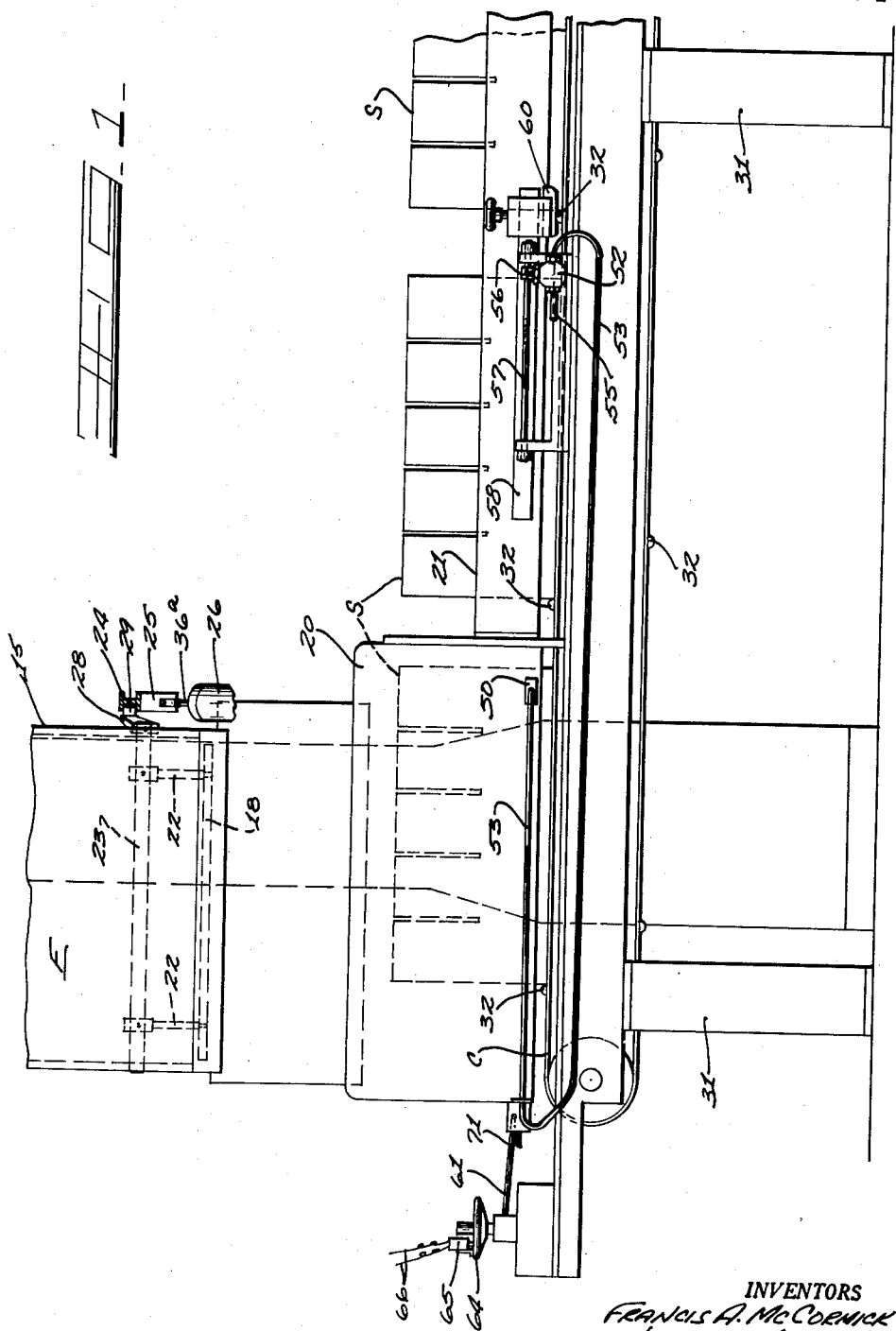

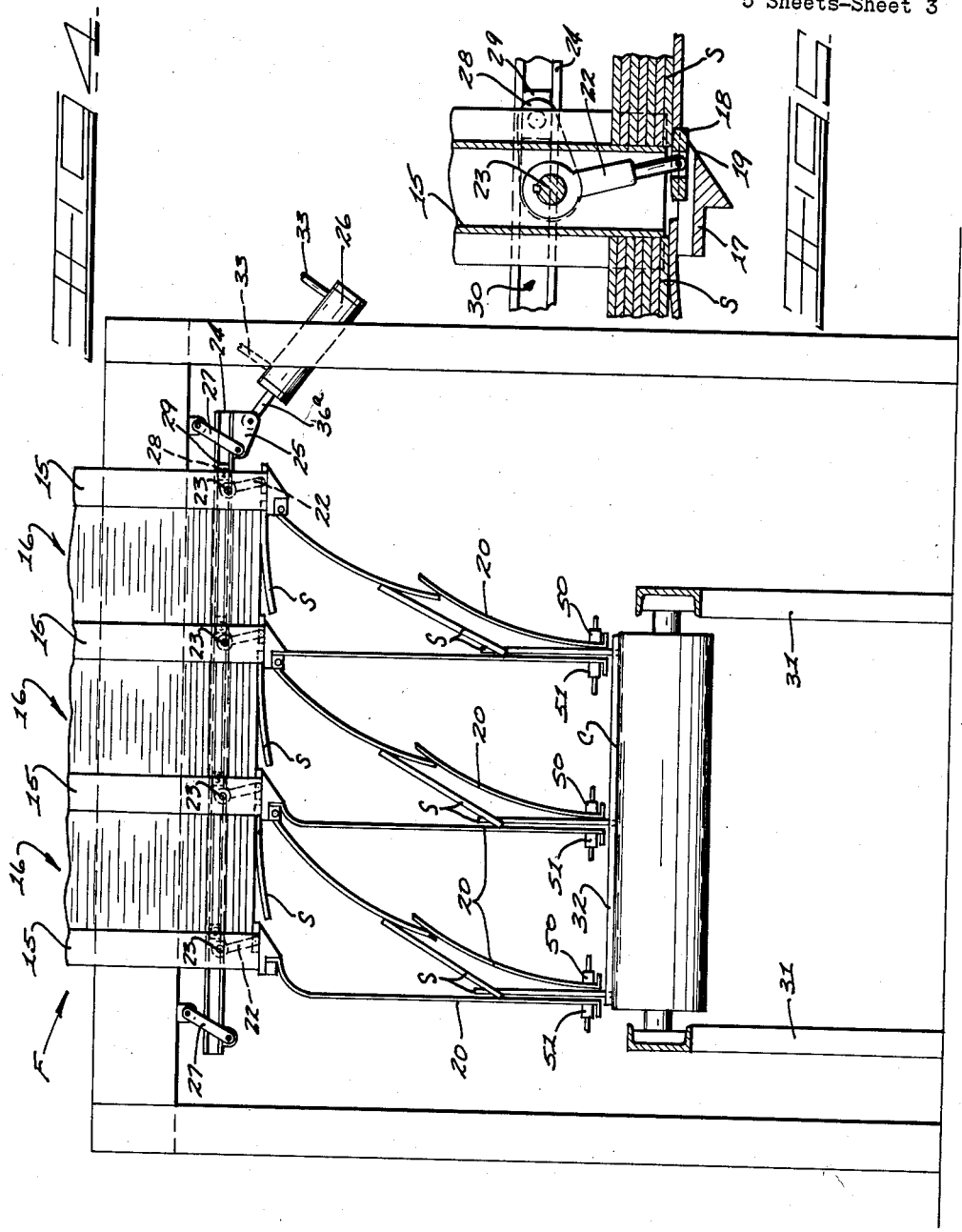

May 19, 1964     F. A. McCORMICK ETAL     3,133,481
ARTICLE FEED CONTROL APPARATUS AND METHOD
Filed June 29, 1961     5 Sheets-Sheet 4
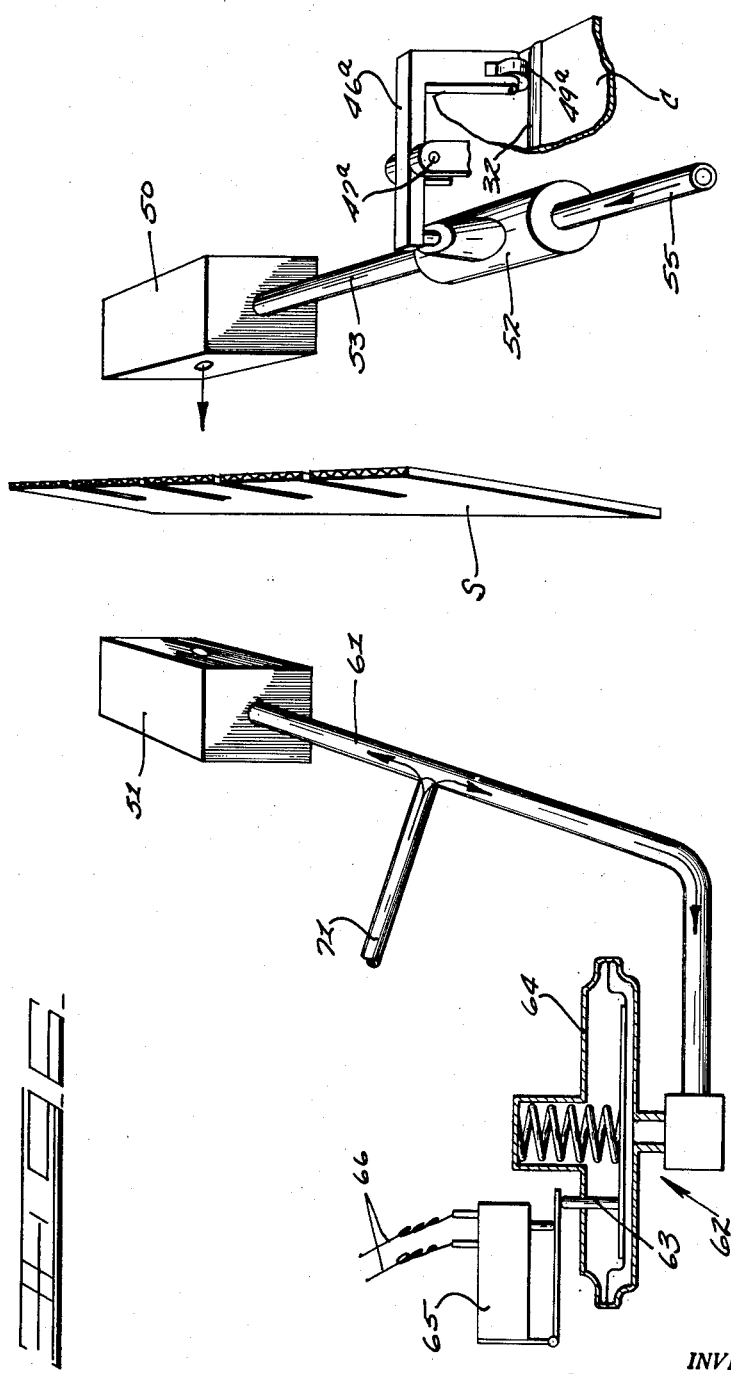

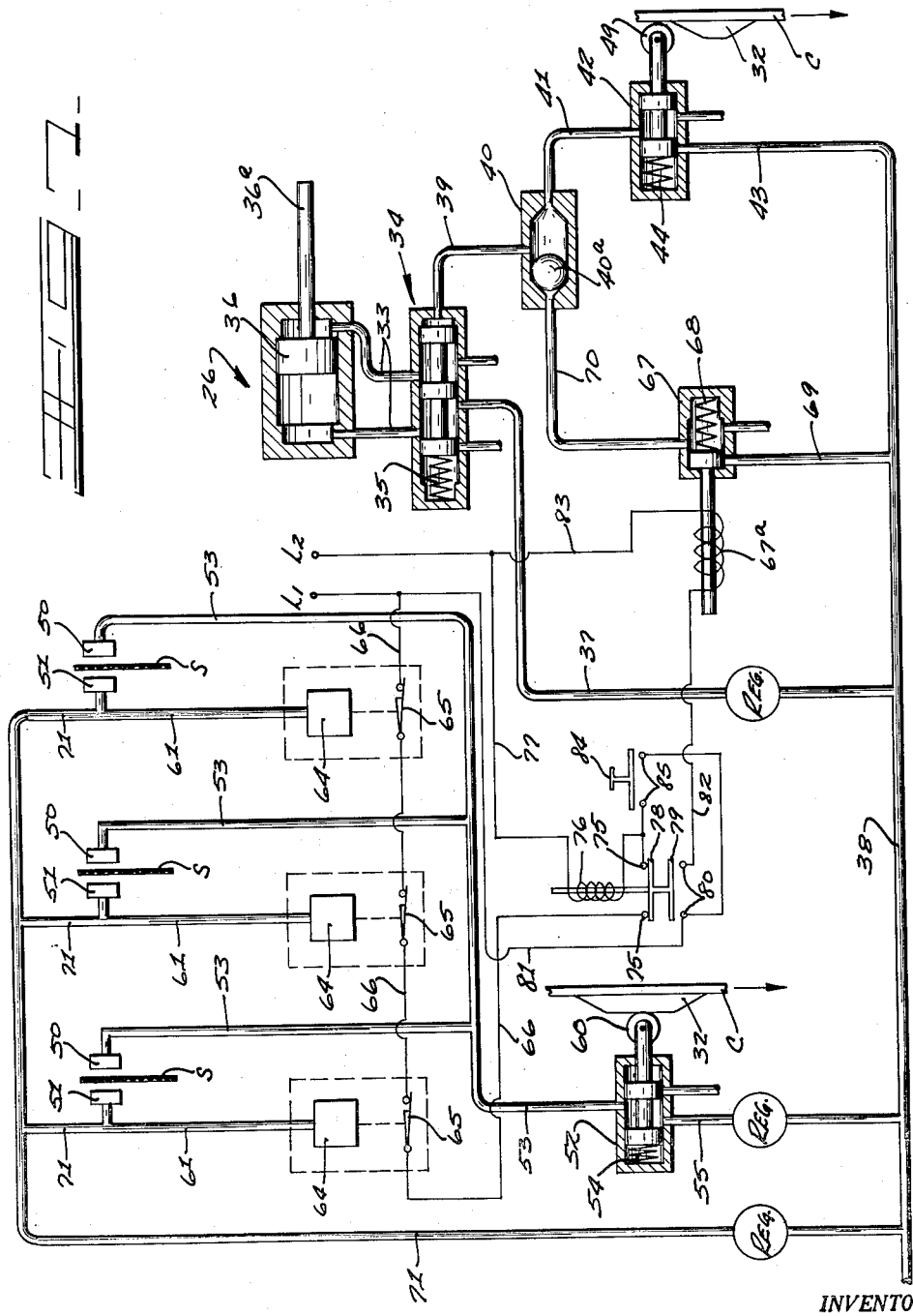

United States Patent Office 3,133,481
Patented May 19, 1964

3,133,481
ARTICLE FEED CONTROL APPARATUS AND METHOD
Francis A. McCormick and Walter T. Nachtrab, Toledo, Ohio, assignors to Owens-Illinois Glass Company, a corporation of Ohio
Filed June 29, 1961, Ser. No. 120,768
13 Claims. (Cl. 93—37)

Our invention relates to a method of and apparatus for controlling the delivery of articles to a conveyor and has for an important object the detection of the presence or absence of an article at a predetermined point, at a given time on the conveyor, and in response to either the absence from or improper positioning of an article on the conveyor, automatically deactivating an article feeder or delivery means.

Our invention more particularly relates to partition assembly machines and more especially concerns the provision of simple, reliable means operable in response to failure of a partition strip to assume a predetermined normal position in an assembly cycle to terminate operation of a partition feeder device of the assembly machine.

Partitions of the type with which we are concerned comprise a plurality of parallel longitudinal strips and a number of cross-strips or partitions, these being notched or slotted and assembled to form a filler unit which, when placed in a carton provides article accommodating cells. The longitudinal and cross-strips, or partitions, are assembled by automatic mechanical means, such for example as that forming the subject matter of Pat. No. 2,163,923, issued June 27, 1939, to Vail and Dauber.

The longitudinal strips ordinarily are arranged in vertical stacks as in Schroeder Pat. No. 2,723,602, issued November 15, 1955, and released one at a time from the bottom of each stack to fall by gravity into longitudinal guides which overlie an endless conveyor, the latter supporting the strips in on-edge positions and in end to end relationship. The conveyor advances the longitudinal strips in aligned groups, or sets, with slotted, or notched edges uppermost to an assembly point where a so-called "knocker-bar" drives cross-partitions or strips downwardly one at a time and interlocks them with the longitudinal strips. This assembly operation is effected at such high speed and the down-stroke of the "knocker-bar" is so timed with advance of the longitudinal strips that the latter may move continuously, thus contributing to high production speeds.

We have observed that from time to time a longitudinal partition strip is improperly delivered to the conveyor, or perhaps, as in some few instances, does not reach the conveyor or intended guide. Obviously, in either event an incomplete filler will be produced. On the one hand, the filler may leave the assembly with one less strip than is required, while on the other hand, one longitudinal strip may be improperly positioned to accommodate a cross-strip. In the latter event, lowering of the "knocker-bar" and a cross-strip crushes several strips and necessitates scrapping the filler. Also, production is often interrupted by the necessity to clean and clear the jammed machine. An important object of our invention is, therefore, the provision of effective novel means operable in response to absence of a longitudinal partition strip or other article from its pre-assigned location or improper positioning of same on the conveyor, to immediately stop operation of the feeder unit for these strips.

Another object of our invention is the provision of means utilizing stream of air under pressure directed across the path of travel of the longitudinal partition strips in controlling operation of the feeder for said strips.

A further object of our invention is the provision of means of the above character in which the longitudinal partition strips, if in normal pre-assigned positions upon the conveyor, function as barriers to movement of a stream of air under pressure to a unit which is operatively connected to a feeder control.

Other objects will be in part apparent and in part pointed out hereinafter.

In the accompanying drawings forming a part of our application and wherein like reference characters identify like parts throughout:

FIG. 1 is a fragmentary side elevational view of a partition assembling machine incorporating our invention, the knocker-bar and cross-strips feed unit being omitted.

FIG. 2 is a top plan view of the machine with the longitudinal partition feeder removed.

FIG. 3 is a sectional elevational view taken along the line 3—3 of FIG. 2 showing the main air flow control valve and the conveyor flight bar actuated means for opening and closing said valve.

FIG. 4 is a sectional elevational view across the conveyor facing the longitudinal partition feeder.

FIG. 5 is a detail sectional elevational view of a portion of the partition strip feeder actuating mechanism.

FIG. 6 is an exploded view partly in perspective and partially in sectional elevation diagrammatically showing the control mechanism comprising our invention.

FIG. 7 is a piping and wiring diagram.

Our invention is illustrated in conjunction with a partition strip handling mechanism comprising a feeder F overlying the receiving or charging end of a conveyor C which carries preformed, notched, or slotted longitudinal partition strips S to the usual assembly point (not shown) where, in customary fashion, and by known means, cross-partition strips (not shown) are interlocked with the longitudinal strips.

The strip feeder F may well utilize the principle of the mechanism disclosed in the Schroeder patent, identified above, in that the strips are arranged in vertical stacks and delivery is effected by separating each bottommost strip from its stack and permitting it to fall freely over a deflector plate to an on-edge position upon the conveyor C. This feeder F or hopper (FIGS. 1, 4 and 5) may well comprise a plurality of frame members or dividers 15, four being illustrated in the present case, such being spaced apart to provide three vertical stack accommodating compartments 16. Each of these dividers 15 is a hollow member with its lower end carrying a supporting plate 17 and a movable ejector blade 18. Each supporting plate has one bevelled edge 19 which, as will be apparent presently, facilitates separation of the lowermost partition strip S from its stack during each feeding cycle. Normally at the beginning of a production run the stacks of strips rest upon the edges of the supporting plates 17. Reciprocation of the ejector blade 18 (FIGS. 4 and 5) to the right pushes the bottommost strips to the right so that it is no longer supported by the bevel edge end of the plate 17. Thereupon, each bottom strip assumes the position indicated in FIG. 4. Reverse movement of the ejector blade 18 pushes the strip off of the supporting plates 17. Because the freed edge of each strip has dropped slightly to a plane below the bevelled edge 19 the latter effectively directs the released strips for free-falling over deflectors 20 into guides 21 which overlie the conveyor C.

Actuation of each ejector blade 18 is effected by mechanism comprising a pair of rocker arms 22 (FIGS. 1 and 5) depending from and keyed to a horizontal shaft 23, there being one such shaft in each divider 15. The ejector blade 18 is pivoted to the lower end of said rocker arms 22. This is the construction of each of the several feed devices which are mounted in the dividers. Operation of the several rocker arms in unison is obtained by means including a horizontally reciprocable bar 24 (FIGS. 1 and 5) which through suitable linkage 25 (FIG. 4) is moved by a piston air motor 26. This bar 24 is suspended from a pair of pivoted arms 27, and, as is apparent, both reciprocates and rises and lowers slightly. Each shaft 23 is keyed to a lever 28 or arm which carries a slide block 29, the latter being fitted in a longitudinal channel 30 in the bar 24. Thus, with the described movement of the bar, it is evident that the shafts 23 will be oscillated and the ejector blades 18 reciprocated, as explained above, resulting in the placement of three strips in the guides 21 over said conveyor C.

The conveyor C continuously advances the partition strips in succession and on-edge along predetermined horizontal paths to an assembly point (not shown) where they are interlocked with other partition strips (not shown) by any approved mechanism. This conveyor is of the endless belt type, being mounted upon a frame 31 and provided with a plurality of transverse flight-bars 32 which, as is apparent, function to advance the strips by engaging the rearmost end of each as it is dropped onto the conveyor. Any constructional means (not shown) may drive the conveyor. These flight-bars 32 in addition to advancing the strips along their respective paths also function to control operation of the feeder, as will now be explained.

The air motor 26 (FIGS. 1, 4 and 7) has its opposite ends connected by pipes 33 to a control valve 34, which may be the conventional spool-type with a coil spring 35 arranged to so hold the valve as to deliver air under pressure to that side of the motor piston 36 which will insure projection of the ejector blade to the FIG. 5 position. This is the position assumed just prior to actual ejection, or discharge of a strip from the feeder. Air under pressure is supplied to the valve housing through a conduit 37 which is connected to a main supply line 38. Movement of the valve (FIG. 1) to the left against the spring pressure reverses the motor operation and moves the ejector blades to discharge a group of strips. Such reversal of the valve to effect strip delivery is obtained by introducing air under pressure at that end of the valve opposite the spring 35. A conduit 39 connects the valve 34 and a two-way ball check valve 40, the latter at one end being connected by a pipe 41 to a flight-bar actuated control valve 42. This control valve 42 (FIGS. 2 and 7) is connected by a pipe 43 to the main supply line 38. Normally this valve is closed by a spring 44. As shown in FIG. 2, this control valve 42 is positioned at one side of the conveyor C and is actuated by a trip device 45 comprising a lever 46 carried by a rock shaft 47. A rockable frame 48 is connected to the shaft 47 and carries an adjustable finger 49 which is placed in the path of advance of the flight-bars 32. The specific construction of this control valve and its actuating mechanism may well be similar to that of the control valve shown in FIG. 3, which is associated with the detecting aspects of our apparatus. With engagement of each flight-bar with the finger 49, partition strips are delivered to the conveyor. Obviously, from time to time, a strip may be inaccurately positioned upon the conveyor, or perhaps the feeder may fail to deliver a strip occasionally. Should this occur, our invention functions to deactivate the feed mechanism.

The above is accomplished, preferably, by detector means including an air supply nozzle 50, one of which is placed at one side of each path of strip travel along the conveyor. This nozzle is capable of directing a stream of air under pressure, (about 15 p.s.i.), across the path of strip travel. Directly across from this supply nozzle 50 is an air recovery nozzle 51, which, under certain conditions, receives the stream of air from said supply nozzle and directs it to a point where it causes shutting down of the feeder. A control valve 52 in the air supply line 53 leading to the nozzle 50, normally is closed by the spring 54. A pipe 55 connects this valve 52 to the main supply line. Opening of the valve is effected by a lever 56 (FIGS. 2 and 3) which is carried by a rock shaft 57. A frame 58 connected to this shaft carries a finger 59 which is slidable along the frame. A shoe 60 on the finger is in position to be engaged by each flight-bar 32 as the latter reaches a predetermined point in the path of travel of the strips. By adjusting the finger 59 along the frame 58 the time of directing a stream of air across the strip path may be varied. In FIG. 6 the showing of this control valve 52 and its actuator is more or less schematic.

Each of the air recovery nozzles 51 (FIGS. 1, 2 and 6) is connected by a pipe 61 to a spring balanced diaphragm 62 having a finger 63 extending through the housing 64 and capable of opening a normally closed microswitch 65. This microswitch is connected by an electric conductor (wire) 66 to terminal L1 of an electric line source. Switches 65 are connected in series in circuit with the contacts 75 of a double relay. One side of coil 76 of the relay is in circuit with contacts 75 and the other side of the coil is connected to the terminal L2 of the electrical source. The coil 76, at the time it is energized, operates the relay contact bar 78 to connect the circuit across contacts 75. This holds the coil energized in the circuit and at the same time lifts contact bar 79 of the relay to break the circuit across contacts 80. The contacts 80 are connected to terminal L1 by wire 81 and to the one side of the solenoid coil 67a for the valve 67 by wire 82. Valve 67 is normally closed by its spring 68. The other side of coil 67a is connected to terminal L2 by wire 83. Thus, the solenoid of valve 67 is normally deenergized and the valve closed. Valve 67 is opened when any one of the series connected microswitches 65 are opened. Thus, when the diaphragm of a switch device 62 is deflected by sufficient pressure in pipe 61 (FIG. 6), its switch 65 breaks the circuit through the upper contacts 75 of the relay and the relay coil 76 is deenergized. This results in shifting of the relay contact bars 78, 79 so that contacts 75 are broken at bar 78 and contacts 80 connected by bar 79. This closes the circuit for energizing coil 67a and valve 67 is opened. This valve 67 is connected to the main supply line 38 by a pipe 69 and to the previously mentioned two-way ball check valve 40 by a pipe 70.

Because of the possibility of carton dust and the like foreign matter being blown into the air recovery nozzle 51, we have connected a low pressure air supply line 71 to the pipe 61. This air, at a positive pressure of about 3 p.s.i., is delivered continuously, and, while it effectively clears the nozzle 51, does not, because of its low pressure, operate the diaphragm.

It should be noted from reference to FIG. 2 that the valve actuator 49 for the valve 42 is shown positioned slightly in advance in the flight-bar path of valve actuator 60 for the valve 52 so that these two valves, 42 and 52, are respectively operated in sequence and synchronized. The valve 42 should be operated so that the feed device will furnish a set of strips S to the guides. The valve 52 will be thereafter actuated in relation to that particular set of strips so that the strips are in place in the guides for sensing or detecting their position by the detecting means. Thus, the valve 42 is first tripped to operate valve 34 and cycle the motor piston 36. This drops a set of partition strips S into the vertical guides so that, if they are properly positioned, they are disposed intermediate the nozzles 50, 51 of the detector means. In rapid succession, the valve 52 is next operated supplying air to each nozzle 50 to sense or detect by nozzle 51 the presence or absence of strips S in their proper places in the guides between the nozzles 50, 51. If one of the strips of the sets is missing or misplaced, the solenoid of valve 67 is energized as just described, and the valve is opened to interrupt cycling of motor valve 34 and hold it to the left position, the opposite setting from that shown on FIG. 7. With the valve held in this position, the piston rod 36a will be retracted and the ejector blades 18 for effecting discharge of the strips S from the hopper will be held at a position opposite that shown on FIG. 5. In such a position, the ejector blades 18 will be ready to start a reciprocating cycle to feed another set of partitions by one complete oscillation of the bar 24 by motor 26 upon restarting the machine after the sensed difficulty, that shut down the machine as described, is cleared.

The machine is restarted by closing manual restart switch 84 (FIG. 7). This switch is a spring loaded type so that the circuit across contacts 85 is closed while the switch is depressed, and, upon release of switch 84, the contacts are broken. A wire 86 connected to wire 81 and source terminal L1 is connected to one contact 85 and the other contact 85 is connected to one side of relay coil 76. In closing contacts 85, the circuit is completed to energize coil 76 and pull the contact bar 79 to break the circuit of solenoid coil 67a and deenergize it. Also, contact bar 78 closes the circuit across contacts 75 which retains the coil 76 energized holding the relay. As solenoid 67a is deenergized, valve 67 returns to closed position and the machine is restarted for normal automatic operation.

Briefly, the operation of the invention is as follows:

Assume the machine to be operating normally and partition strips are advancing along the conveyor in the desired fashion. At the time each flight-bar opens the valve 52, a stream of air is directed toward the path of travel of the strip S or other article. Since the conditions are normal the air impinges against the strip rather than enter the recovery nozzle. Thus, the microswitches 65 remain closed and normal operations continue. In synchronism with opening of the valve 52, the flight-bars also actuate the valves 42 and 34, thereby causing the feeder to deliver one or more partition strips, as explained heretofore.

If, however, the feeder has failed to deliver or release a strip, or perhaps a delivered strip is not accurately positioned in its guide, the stream of air freely moves across the path and enters the air recovery nozzle 51. This air passes through the conduit 61 to the diaphragm and overcomes pressure of the spring, causing opening of a microswitch 65 and energization of the solenoid 67a so that the valve 67 opens. The spool valve 34 is held against further cycling and the subsequent tripping of valve 42 is rendered ineffective for further cycling operation of motor 26. Thus, the spool valve reverses the position indicated in FIG. 7 and is held there while solenoid 67 is energized. Strip feeding is thus discontinued pending correction of the difficulty. Thereafter, the machine is restarted manually and the solenoid 67a deenergized.

The above described air-operated device, which is disclosed as a form of detector means, is shown as our preferred embodiment. The broad objects of the invention may be obtained, however, by utilizing other types of detector means, for example an electrical, an optical or a sonic detector device, for operating the switches 65 in response to the absence of a strip from its normal position in the guide and thereby deactivate the strip feed. Broadly speaking, therefore, all of these mentioned forms of detector means may be operated to sense the presence or absence of an article furnished by an article feeding means and advancing along a preselected path by transmitting at a given point in said path a detector pulse directed across said path at the moment an article normally should reach said point in said path. The presence of an article will cause the transmitted detector pulse to be interrupted and prevent it from operating the detector means. On the other hand, the detector pulse will be utilized upon the absence of a properly positioned article to cause the detector means to operate for deactivating the article feeder means. The term "detector pulse," as used herein, is therefore intended to include any one of several media, such as a stream of a fluid, for example air, a beam of light, sound waves of a preselected high frequency, concentrated heat waves, etc., depending, of course, upon the nature of the detector means employed.

Modifications may be resorted to within the spirit and scope of the appended claims.

We claim:

1. In a machine for assembling longitudinal and cross-partition strips to produce a cell-type filler for a carton, a generally horizontal conveyor having an upper reach for supporting longitudinal partition strips in on-edge positions in end-to-end relationship and in transversely aligned sets, flight-bars on the upper face to engage the rearmost end of the strips and advance them along a predetermined path, longitudinal guides overlying the conveyor to hold the strips in said on-edge positions, a partition strip feeder above a receiving end of the conveyor operable to place sets of strips in said guides with each cycle of operation, a feeder actuator, an air supply nozzle at one side of the said path of each of the strips in said sets thereof capable of directing a stream of air across the path of said strips, and means operable in response to passage of the stream of air entirely across each said path for deactivating said actuator.

2. A machine as defined in claim 1, said means being an air recovery nozzle positioned in alignment with the air supply nozzle but on the opposite side of said path from and to receive air under pressure emitted by the supply nozzle, a spring balanced diaphragm connected to the recovery nozzle and operable by air under pressure received from the latter and an actuator control switch operable by said diaphragm.

3. In a machine for assembling longitudinal and cross-partition strips to produce a cell-type filler for a carton, a generally horizontal conveyor having an upper reach for supporting longitudinal partition strips in one-edge positions in end-to-end relationship and in transversely aligned sets, flight-bars on the upper face to engage the rearmost end of the strips and advance them along a predetermined path, longitudinal guides overlying the conveyor to hold the strips in said on-edge positions, a partition strip feeder above a receiving end of the conveyor operable to place sets of strips in said guides with each cycle of operation, a feeder actuator, an air nozzle at one side of the path of travel of each strip in its guide, a flight-bar actuated air supply control valve common to the air nozzles, and means operated by a stream of air emitted by any of the nozzles and moving across the path of travel of a strip to interrupt operation of said actuator.

4. In combination means for conveying articles in succession and in predetermined relationship along a preselected path, means for positioning articles at one end of the path, means operable in response to movement of the conveying means for initiating operation of the positioning means, an air nozzle capable of directing a stream of air across said path, means for supplying air under pressure to the nozzle, a valve actuated at regular intervals by the conveying means for delivering air to said nozzle and means operable by movement of a stream of air across and beyond said path for deactivating the article positioning means.

5. The combination defined in claim 4, the conveying means including a succession of valve opening devices relatively positioned along the conveying means to actuate the valve concurrently with the arrival of an article at a preselected point.

6. In the method of controlling an article feeder wherein sets of strip-like articles are fed in succession and on edge in substantially parallel, side-by-side relation in a preselected path and advanced abreast along said path, comprising the steps of periodically sending a detector pulse normal to the path of advancing movement of each of said articles at the time they are each properly positioned to normally intercept said pulse, receiving an unintercepted pulse in the absence of one properly positioned article of said set, and deactivating the article feeder in response to the receipt of said unintercepted pulse, whereby the article feeder operates automatically in continuous succession only to simultaneously supply said set of articles so long as all of the articles thereof are properly positioned in said path thereby.

7. In a machine for assembling longitudinal and cross-partition strips to produce a cell-type filler for a carton, a generally horizontal conveyor having an upper reach for supporting longitudinal partition strips in on-edge positions in end-to-end relationship and in transversely aligned sets, flight-bars on the upper face to engage the rearmost end of the strips and advance them along a predetermined path, longitudinal guides overlying the conveyor to hold the strips in said on-edge positions, a partition strip feeder above a receiving end of the conveyor operable to place sets of strips in said guides with each cycle of operation, a feeder actuator, means operable in response to the absence of a strip from its normal position in a guide to deactivate the actuator comprising an air nozzle at one side of each said path capable of directing a stream of air across the path, an air supply valve common to said nozzles actuated by the flight-bars to deliver air under pressure to the nozzles, devices operable by streams of air moving across said paths for deactivating the actuator, and means for causing a nozzle clearing flow of air through the recovery nozzle except when it is receiving air from the other nozzle.

8. In a machine for assembling longitudinal and cross-partition strips to produce a cell-type filler for a carton, a generally horizontal conveyor having an upper reach for supporting longitudinal partition strips in on-edge positions in end-to-end relationship and in transversely aligned sets, flight-bars on the upper face to engage the rearmost end of the strips and advance them along a predetermined path, longitudinal guides overlying the conveyor to hold the strips in said on-edge positions, a partition strip feeder above a receiving end of the conveyor operable to place sets of strips in said guides with each cycle of operation, a feeder actuator, means operable in response to the absence of a strip from its normal position in a guide to deactivate the actuator comprising an air nozzle at one side of each said path capable of directing a stream of air across the path, an air supply valve common to said nozzles actuated by the flight-bars to deliver air under pressure to the nozzles, and devices operable by streams of air moving across said paths for deactivating the actuator comprising a spring-balanced diaphragm connected to the air recovery nozzle and a feeder actuator control switch operable by the diaphragm.

9. In a machine for assembling longitudinal and cross-partition strips to produce a cell-type filler for a carton, a generally horizontal conveyor having an upper reach for supporting longitudinal partition strips in on-edge positions in end-to-end relationship and in transversely aligned sets, flight-bars on the upper face to engage the rearmost end of the strips and advance them along a predetermined path, longitudinal guides overlying the conveyor to hold the strips in said on-edge positions, a partition strip feeder above a receiving end of the conveyor operable to place sets of strips in said guides with each cycle of operation, a feeder actuator, and means operable in response to the absence of a strip from its normal position in a guide to deactivate the actuator comprising an air nozzle at one side of each said path capable of directing a stream of air across the path, an air supply valve common to said nozzles actuated by the flight-bars to deliver air under pressure to the nozzles, and devices operable by streams of air moving across said paths for deactivating the actuator.

10. In mechanism for feeding preformed partition strips in an on-edge position to an assembly zone, an endless conveyor having a generally horizontal upper reach, a plurality of transverse flight-bars on the conveyor, longitudinal vertical guides overlying the upper reach to define a path of travel and to hold partition strips on edge in the guides at one end of the conveyor, a feeder actuator, means operable by advance of the flight-bars to operate the feeder actuator, means operable in response to the absence of a strip from its normal position in its guide for deactivating the actuator comprising an air nozzle capable of directing a stream of air under pressure across said path, an air supply conduit and control valve for said nozzle, means whereby the flight-bars actuate said valve, and means operable by a nozzle directed air stream passing across and beyond said path for deactivating the feeder actuator.

11. In mechanism for feeding preformed partition strips in an on-edge position to an assembly zone, an endless conveyor having a generally horizontal upper reach, a plurality of transverse flight-bars on the conveyor, longitudinal vertical guides overlying the upper reach to define a path of travel and to hold partition strips on edge in the guides at one end of the conveyor, a feeder actuator, means operable by advance of the flight-bars to operate the feeder actuator, means operable in response to the absence of a strip from its normal position in its guide for deactivating the actuator comprising an air nozzle capable of directing a stream of air under pressure across said path, an air supply conduit and control valve for said nozzle, means whereby the flight-bars actuate said valve and an air recovery nozzle opposed to and aligned with the air nozzle to receive air from the latter at intervals when a partition strip is abnormally positioned, and means utilizing air entering the recovery nozzle for deactivating the feeder actuator.

12. In combination, an article feeder, means automatically operating the article feeder for supplying sets of strip-like articles in succession and on edge, means for supporting and conveying sets of articles supplied by said feeder, the articles of each set being advanced in abreast fashion, guide means for positioning the articles of said sets thereof in a substantially, side-by-side relation in a predetermined path as they are advanced by said conveying means, means for intermittently directing a detector pulse normal to the path of advance of each of the articles in a set thereof, control means connected to the last-named means for sending a detector pulse at a time the articles of said set are properly positioned abreast of each other at a predetermined point of advancing movement in said guide means, means mounted opposite the means directing the detector pulse normal to the articles of said set for receiving a detector pulse that is sent across said path of the articles and unintercepted due to the absence of a properly positioned article of said set, and means operated in response to receipt of a pulse by said pulse receiving means and connected to said means operating the article feeder for deactivating the article feeder, the latter supplying said sets of articles only so long as all of the articles of a said set are properly positioned in said path.

13. In combination, means for conveying articles in succession and in predetermined relationship along a preselected path, means for positioning articles at one end of the path, means operable in response to movement of the conveying means for actuating the positioning means, an air nozzle capable of directing a stream of air under pressure across said path, an air supply means including a control valve connected to said nozzle, means for operating said valve and supply air to the nozzle responsive to movement of the conveying means in bringing the articles to a predetermined advanced position in said path, an air recovery nozzle opposed to and aligned with said air nozzle to receive air from the latter in the absence of an article at the predetermined advanced position in said path, means operated by predetermined air flow entering the recovery nozzle and connected for deactivating said means positioning articles at the end of said path, and means normally creating a predetermined positive air pressure in said recovery nozzle sufficient to prevent entry of foreign matter into said recovery nozzle and thereby avoid malfunction of the last-named means.

References Cited in the file of this patent

UNITED STATES PATENTS

| | | |
|---|---|---|
| 1,839,495 | Paynter | Jan. 5, 1932 |
| 2,063,479 | Belluche | Dec. 8, 1936 |
| 2,362,134 | Honig | Nov. 7, 1944 |
| 2,742,827 | Schroeder | Apr. 24, 1956 |
| 2,776,224 | Cote | Jan. 1, 1957 |
| 2,827,293 | Battey | Mar. 18, 1958 |